(12) United States Patent
Oka et al.

(10) Patent No.: US 10,005,433 B2
(45) Date of Patent: Jun. 26, 2018

(54) WIPER-WASHER CONTROL DEVICE

(71) Applicants: ASMO CO., LTD., Kosai, Shizuoka-pref. (JP); Fuji Jukogyo Kabushiki Kaisha, Shibuya-ku, Tokyo (JP)

(72) Inventors: Shinji Oka, Toyohashi (JP); Naoya Mitsuoka, Toyohashi (JP); Wataru Uemura, Hamamatsu (JP); Yuji Katsumata, Ashikaga (JP)

(73) Assignee: ASMO CO., LTD., Kosai (JP)

( * ) Notice: Subject to any disclaimer, the term of this patent is extended or adjusted under 35 U.S.C. 154(b) by 64 days.

(21) Appl. No.: 15/194,584

(22) Filed: Jun. 28, 2016

(65) Prior Publication Data
US 2017/0001602 A1 Jan. 5, 2017

(30) Foreign Application Priority Data

Jun. 30, 2015 (JP) .................................. 2015-131930
Jun. 6, 2016 (JP) .................................. 2016-112865

(51) Int. Cl.
*B60S 1/02* (2006.01)
*B60S 1/48* (2006.01)

(52) U.S. Cl.
CPC ............... *B60S 1/482* (2013.01); *B60S 1/487* (2013.01)

(58) Field of Classification Search
CPC . B60H 1/00785; B60H 1/00878; B60S 1/482; B60S 1/487; B60S 1/08
USPC ........ 701/22, 36, 65; 340/933, 576; 180/333
See application file for complete search history.

(56) References Cited

U.S. PATENT DOCUMENTS

| 8,555,454 | B2 * | 10/2013 | Jacobowitz | B60S 1/3805 15/250.04 |
| 9,114,784 | B2 * | 8/2015 | Calluiere | B60S 1/482 |
| 2004/0134995 | A1 * | 7/2004 | Keeler | B60H 1/16 237/12 |
| 2007/0227718 | A1 * | 10/2007 | Hill | B60H 1/00785 165/231 |

FOREIGN PATENT DOCUMENTS

| JP | S55-29642 A | 3/1980 |
| JP | 2013-522102 A | 6/2013 |

* cited by examiner

*Primary Examiner* — Dalena Tran
(74) *Attorney, Agent, or Firm* — SOLARIS Intellectual Property Group, PLLC (57) ABSTRACT

The wiper-washer control device includes a wiper motor that causes a wiper blade to perform a wiping operation, a washer pump that causes a washer fluid to be sprayed, and a controller that, in cases in which defrosting has been instructed, controls the wiper motor and the washer pump such that a defrosting operation in which the wiping operation and spraying of washer fluid is performed in a predetermined combination.

14 Claims, 6 Drawing Sheets

WIPER-WASHER CONTROL DEVICE

CROSS-REFERENCE TO RELATED APPLICATION

This application is based on and claims priority under 35 USC 119 from Japanese Patent Application No. 2015-131930 filed on Jun. 30, 2015, and Japanese Patent Application No. 2016-112865 filed on Jun. 6, 2016, the disclosures of which are incorporated by reference herein.

TECHNICAL FIELD

The present invention relates to a wiper-washer control device that sprays washer fluid and performs a wiping operation using a wiper blade in coordination with each other.

RELATED ART

Wiper-washer control devices are generally known in which, when a washer switch has been operated so as to be switched on, a wiper is driven in coordination with this operation.

In recent years, wiper arms and wiper blades are known to be provided with nozzles due to issues relating to the spraying position of washer fluid and issues relating to vehicle design (see, for example, Japanese Patent Application Laid-Open (JP-A) No. S55-29642 (Patent Document 1)).

However, there are usage environments in which frost occurs on windshield glass of a vehicle during winter or in cold climate regions. A field of vision cannot be secured in a state in which frost has stuck to the windshield glass, and so there is a need to remove the frost prior to setting off.

In general wiper-washer devices, including that of Patent Document 1 described above, frost cannot be easily removed in an environment in which frost has stuck on, even if washer fluid is sprayed thereon. Thus, defrosting is normally performed by methods such as using a defroster of an air conditioning unit, or pouring warm water on the windshield glass in order to melt the frost. Time is thereby required until the frost is removed, which is a burden on the user.

SUMMARY

In consideration of the above circumstances, an object of the present invention is to provide a wiper-washer control device capable of easily removing frost.

A wiper-washer control device of the present invention includes a wiper motor that causes a wiper blade to perform a wiping operation on a wiping surface, a washer pump that causes a washer fluid to be sprayed, and a control unit that, when defrosting of the wiping surface has been instructed, controls the wiper motor and the washer pump such that a defrosting operation in which the wiping operation and spraying of washer fluid is performed in a predetermined combination.

In the wiper-washer control device of the above configuration, the wiping operation of the wiping surface using the wiper blade is performed by the wiper motor, and washer fluid is sprayed by the washer pump.

When defrosting has been instructed by a switch, for example, the control unit controls the wiper motor and the washer pump to perform the defrosting operation of the wiping surface, in which the wiping operation and the spraying of washer fluid is performed in a predetermined combination. Performing the defrosting operation by the combination of the wiping operation and the spraying of washer fluid enables frost to be easily removed, as opposed to the simple wiping away of rain drops.

In the wiper-washer control device of the present invention, the control unit controls the wiper motor and the washer pump such that a first process of performing the wiping operation at a predetermined first speed, a second process of stopping both the wiping operation and the spraying of washer fluid each for a specific duration, and a third process of performing the wiping operation at the first speed or a second speed that is different from the first speed, are performed in sequence as the defrosting operation.

In the wiper-washer control device of the above configuration, by spraying the washer fluid and performing the wiping operation at the first speed in the first process, the washer fluid is spread over the frost across a wiping range of the wiping surface. By stopping both the wiping operation and the spraying of washer fluid in the second process, the spread washer fluid can be made to soak through the frost. By performing the wiping operation at the first speed or the second speed that is different from the first speed in the third process, the frost through which the washer fluid has soaked can be stripped away. This enables the frost to be easily removed.

In the wiper-washer control device of the present invention, in the third process, the control unit is set such that the second speed is a speed of the wiping operation that is slower than the first speed.

In the wiper-washer control device of the above configuration, in the third process, by setting the control unit such that the second speed is a speed of the wiping operation that is slower than the first speed, the frost can be more reliably removed than in cases in which the speed is set faster than the first speed.

In the wiper-washer control device of the present invention, the control unit controls the wiper motor and the washer pump such that a fourth process of spraying the washer fluid on the wiping surface and performing the wiping operation at a third speed that is faster than at least one of the first speed or the second speed, is performed following after the third process.

In the wiper-washer control device of the above configuration, by spraying the washer fluid and performing the wiping operation at the third speed that is faster than at least one of the first speed or the second speed in the fourth process performed following after the third process, frost that was removed in the first to third processes can be swept away, and washer fluid can also be spread by force due to inertia to defrost a leading end side of the wiper blade on further accelerating the wiping speed compared to the first process.

In the wiper-washer control device of the present invention, the control unit controls the wiper motor and the washer pump such that the second process and the first process are performed again in sequence following after the fourth process.

In the wiper-washer control device of the above configuration, by stopping both the wiping operation and the spraying of washer fluid again in the second process following after the fourth process, the washer fluid that has also been spread to a leading end portion of the wiper blade in the fourth process can be made to soak through the frost. By spraying washer fluid and performing the wiping operation at the first speed or the second speed in the first process, the frost can be stripped away and wiped-up.

In the wiper-washer control device of the present invention, the control unit controls the wiper motor and the washer pump such that processes including a first process of spraying the washer fluid on the wiping surface for a specific duration and performing the wiping operation using the wiper blade, a second process of stopping the wiping operation using the wiper blade for a specific duration at a to-and-fro return position of the wiping operation, and a third process of stopping spraying of the washer fluid and performing the wiping operation, are performed as the defrosting operation.

In the wiper-washer control device of the above configuration, in the first process, the washer fluid can be spread over the frost across a wiping range of the wiping surface. By stopping the wiping operation using the wiper blade for a specific duration at the to-and-fro return position of the wiping operation in the second process, the spread washer fluid can be made to soak through the frost. By stopping spraying the washer fluid and performing the wiping operation in the third process, the frost through which the washer fluid has soaked can be stripped away and wiped-up. This enables the frost to be easily removed.

In the wiper-washer control device of the present invention, in the second process, the wiping operation of the wiper blade is stopped for a specific duration at at least one return position from out of two return positions in the to-and-fro wiping operation.

In the wiper-washer control device of the above configuration, by stopping the wiping operation of the wiper blade for a specific duration at at least one return position from out of the two return positions in the to-and-fro wiping operation as the second process, the washer fluid can be made to soak through the frost.

In the wiper-washer control device of the present invention, in the second process, the wiping operation of the wiper blade is stopped for a specific duration at two consecutive return positions in the to-and-fro wiping operation.

In the wiper-washer control device of the above configuration, by stopping the wiping operation of the wiper blade for a specific duration at the two consecutive return positions in the to-and-fro wiping operation as the second process, the washer fluid can be made to reliably soak through the frost.

In the wiper-washer control device of the present invention, in the second process, the wiping operation of the wiper blade is stopped for a specific duration at each of two return positions in the to-and-fro wiping operation, and a stopping duration at a return position from an outward path to a return path is set as a longer stopping duration than a stopping duration at a return position from the return path to the outward path.

In the wiper-washer control device of the above configuration, by stopping the wiping operation of the wiper blade for a specific duration at each of the two return positions in the to-and-fro wiping operation, and by setting a stopping duration at the return position from the outward path to the return path as a longer stopping duration than a stopping duration at the return position from the return path to the outward path as the second process, the frost can be melted and the wiper blade can easily abut the wiping surface, due to the washer fluid running down along the wiper blade at the return position from the outward path to the return path.

In the wiper-washer control device of the present invention the control unit controls the wiper motor and the washer pump such that an initial process of spraying the washer fluid for a specific duration without starting the wiping operation is performed as an initial operation prior to the defrosting operation.

In the wiper-washer control device of the above configuration, by spraying the washer fluid for a specific duration without starting the wiping operation in the initial process serving as the initial operation prior to the defrosting operation, the washer fluid can be made to pool on the wiper blade, and the washer fluid can be better spread in the first process that follows.

In the wiper-washer control device of the present invention, the washer pump pressurizes and feeds the washer fluid to a first nozzle that sprays washer fluid toward an outward path swinging side of the wiper blade during outward path swinging of a wiper arm that swings to-and-fro between a lower return position and an upper return position of the wiper blade, and to a second nozzle that sprays washer fluid toward a return path swinging side of the wiper blade during return path swinging of the wiper arm.

In the wiper-washer control device of the above configuration, the spraying of washer fluid can be switched according to the respective to-and-fro swinging direction of the wiper arm using the first nozzle and the second nozzle.

In the wiper-washer control device of the present invention, a defrosting instruction section that instructs the defrosting operation is separately included.

In the wiper-washer control device of the above configuration, by separately including the dedicated instruction section to instruct defrosting, the defrosting instruction can be distinguished from the respective instructions for the wiping operation of the wiper blade and the spraying of washer fluid.

DETAILED DESCRIPTION

Figure 1:
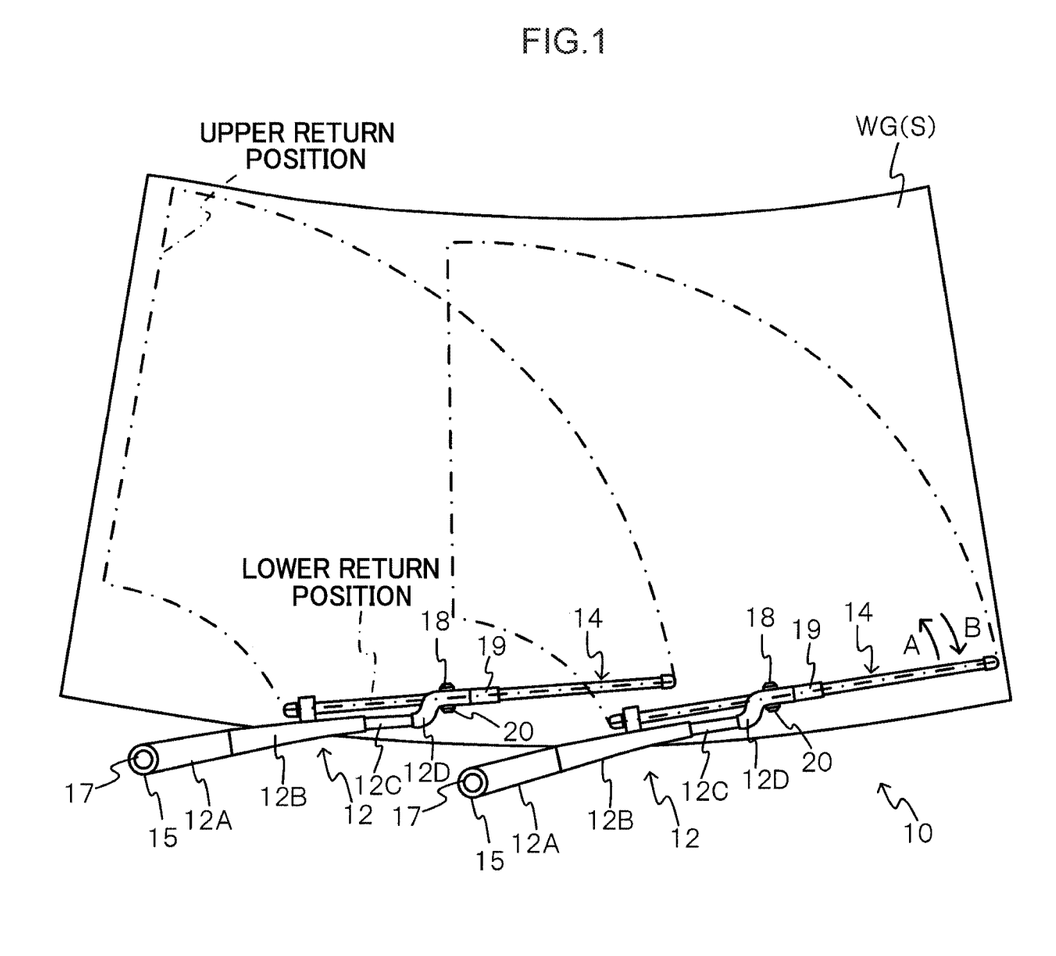
FIG. 1 is a plan view viewed from the outside of a wiping surface, illustrating an entire vehicle wiper device that is subject to control by a wiper-washer control device according to an exemplary embodiment.

Detailed explanation follows regarding an example of an exemplary embodiment, with reference to the drawings. FIG. 1 is a plan view viewed from the outside of a wiping surface, illustrating an entire vehicle wiper device subject to control by a wiper-washer control device according to the present exemplary embodiment.

As illustrated in FIG. 1, a vehicle wiper device 10 is configured including substantially elongated shaped wiper arms 12, and wiper blades 14 that wipe windshield glass WG, serving as a wiping surface of a vehicle (automobile). The vehicle wiper device 10 is also configured including first main nozzles 18 and second main nozzles 20 respectively provided in the vicinity of leading end portions of the wiper arms 12.

Each wiper arm 12 is configured including an arm head 12A, a retainer 12B, an arm piece 12C, and an arm-side coupling member 12D. The arm head 12A configures a base end portion of the wiper arm 12, the retainer 12B configures a length direction intermediate portion of the wiper arm 12, and the arm piece 12C and the arm-side coupling member 12D configure the leading end portion of the wiper arm 12.

The arm head 12A is formed in a substantially rectangular column shape made of die-cast aluminum, for example. A fixing portion 15 is formed at a base end portion of the arm head 12A. A leading end portion of a substantially circular column shaped pivot shaft 17 is fastened and fixed to the fixing portion 15. The pivot shaft 17 is supported so as to be capable of swinging by a pivot holder (not illustrated in the drawings) fixed to a frame of the vehicle or the like, and is coupled to a wiper motor (not illustrated in the drawings) through a link mechanism. The pivot shafts 17 are swung to-and-fro by the drive force of the wiper motor, and the respective wiper arms 12 are thereby swung to-and-fro between a lower return position (the position illustrated in FIG. 1) and an upper return position (see the single-dotted dashed line in FIG. 1). In the present exemplary embodiment, a position where the wiper arms 12 are hidden behind an engine hood of the vehicle further toward the arrow B direction side (vehicle lower side) in FIG. 1 than the lower return position configures a stowed position, and the wiper arms 12 are stowed in the stowed position when the wiping operation has stopped. Thus, the wiper motor is configured so as to swing the wiper arms 12 to-and-fro by reversing rotation between the upper return position and the lower return position, rather than continuously rotating in one direction. An electric motor including a control circuit that controls the number of rotations by pulse width modulation (PWM) control or the like is employed as the wiper motor. Note that the arrow A direction from the lower return position toward the upper return position in FIG. 1 configures an outward path swing direction of the wiper arms 12, and the arrow B direction from the upper return position toward the lower return position in FIG. 1 configures a return path swing direction of the wiper arms 12. Namely, the return position of the wiper blades 14 from the outward path to the return path is the upper return position, and the return position of the wiper blades 14 from the return path to the outward path is the lower return position. In the present exemplary embodiment, since the wiper arms 12 are stowed in the stowed position as described above, explanation follows regarding an example of a configuration in which the wiper motor drives in forward rotation and reverse rotation; however, a configuration may be applied in which the wiper motor rotates in one direction with the stowed position (stopped position) as the lower return position.

Each wiper blade 14 is formed in a substantially elongated shape, and is disposed alongside the respective wiper arm 12 in the length direction. A length direction center portion of the wiper blade 14 is coupled to a leading end portion of the arm-side coupling member 12D of the respective wiper arm 12 through a coupling lever 19. Thus, as viewed from a direction orthogonal to a wiping surface S, the wiper blade 14 is disposed at the outward path swinging direction side with respect to the respective wiper arm 12 (a portion of the wiper arm 12 excluding the arm-side coupling member 12D).

Figure 2A:
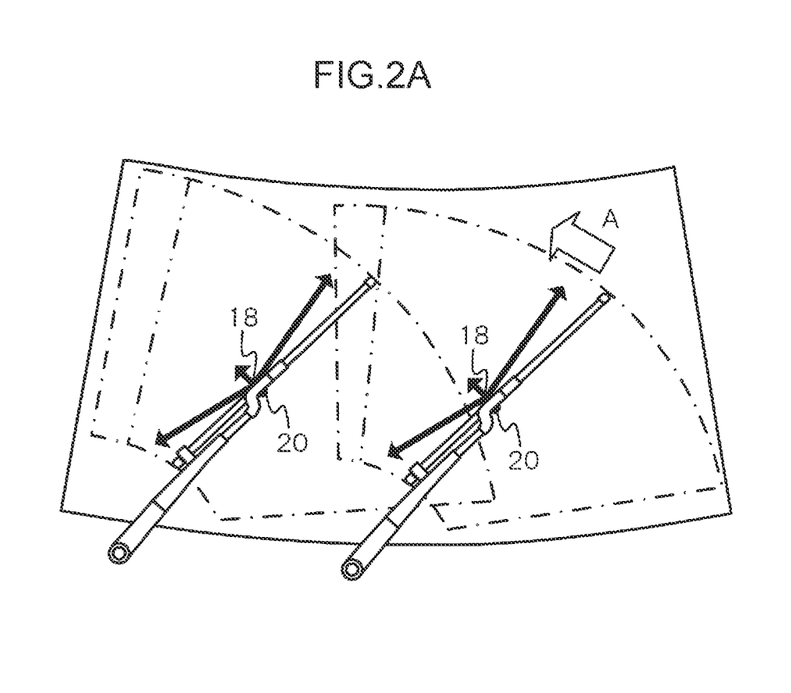
FIG. 2A is a drawing illustrating spraying of washer fluid from first main nozzles when a wiper arm swings in an outward path swing direction.
Figure 2B:
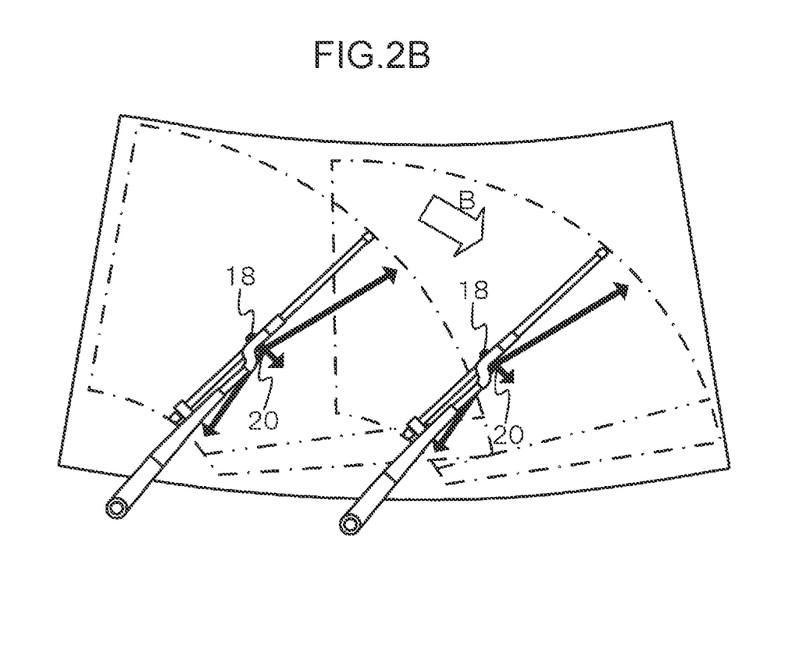
FIG. 2B is a drawing illustrating spraying of washer fluid from second main nozzles when the wiper arm swings in a return path swing direction.

Washer fluid is sprayed from the first main nozzles 18 and the second main nozzles 20. In the present exemplary embodiment, when a washer switch 36 (see FIG. 3), described later, is operated to spray washer fluid, as illustrated in FIG. 2A, washer fluid is sprayed from the first main nozzles 18 toward the outward path swinging side of the wiper blades 14 while the wiper arms 12 swing along the outward path. As illustrated in FIG. 2B, washer fluid is sprayed from the second main nozzles 20 toward the return path swinging side of the wiper blades 14 while the wiper arms 12 swing along the return path. The spraying of washer fluid is stopped at respective predetermined positions directly prior to reaching the upper return position when swinging in the outward path swinging direction, and directly prior to reaching the lower return position when swinging in the return path swinging direction (the positions illustrated by double-dotted dashed lines in FIGS. 2A and 2B). Wasteful spraying of washer fluid is prevented by switching the spraying nozzles and resuming the spraying of washer fluid at the respective return positions.

Figure 3:
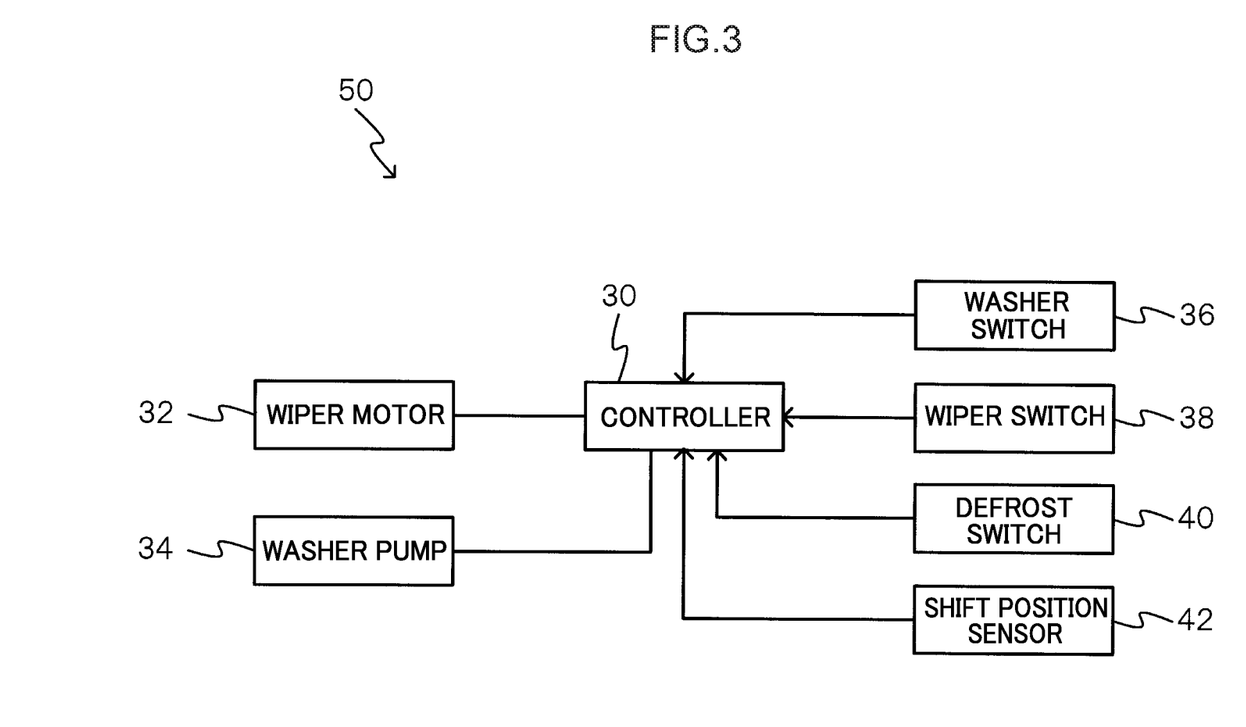
FIG. 3 is a block diagram illustrating a configuration of a wiper-washer control device according to the present exemplary embodiment.

FIG. 3 is a block diagram illustrating configuration of a wiper-washer control device according to the present exemplary embodiment.

A wiper-washer control device 50 includes a wiper motor 32, a washer pump 34, and a controller 30 serving as a control unit.

The wiper motor 32 is driven to swing the wiper arms 12 to-and-fro. The washer pump 34 pressurizes and feeds washer fluid to the respective first main nozzles 18 and second main nozzles 20, such that washer fluid is sprayed from the respective nozzles. The wiper motor 32 and the washer pump 34 are each connected to the controller 30, and are driven under the control of the controller 30.

The washer switch 36, a wiper switch 38, a defrost switch 40, and a shift position sensor 42, provided at the vehicle side, are also connected to the controller 30.

The washer switch 36 is a switch for instructing the spray of washer fluid, and an operation result is input to the controller 30 when the washer switch 36 has been operated by an occupant.

In the present exemplary embodiment, when the washer switch 36 has been operated by the occupant so as to instruct the spray of washer fluid, the operation result of the washer switch 36 is input to the controller 30. When the operation result of the washer switch 36 is input to the controller 30, the controller 30 drives the washer pump 34 straight away to spray a specific amount of washer fluid, then starts to drive the wiper motor 32, based on the operation result of the washer switch 36. Namely, when the washer switch 36 has been operated, the controller 30 controls the wiper motor 32 and the washer pump 34 such that the spraying of washer fluid and the wiping operation using the wiper blades 14 are performed in coordination with each other.

The wiper switch 38 is a switch for instructing the start of the wiping operation using the wiper blades 14, and an operation result is input to the controller 30 when the wiper switch 38 has been operated by the occupant. The wiper switch 38 is capable of instruction to operate the speed of the wiping operation using the wiper blades 14 at plural speeds. When the operation result of the wiper switch 38 is input to the controller 30, the controller 30 drives the wiper motor 32 at the instructed speed and starts the wiping operation using the wiper blades 14 based on the operation result of the wiper switch 38. Note that in the present exemplary embodiment, explanation follows regarding an example in which the speeds of the wiping operation using the wiper blades 14 when the wiper switch 38 has been operated include four speeds, these being intermittent operation, low speed, medium speed, and high speed.

The defrost switch 40 is a switch for instructing a defrosting operation (an operation mode to efficiently eliminate frost, described in detail later, which is different from the above-described wiping away of raindrops and elimination of dirt), in which the spraying of washer fluid and the wiping operation using the wiper blades 14 is performed in a predetermined combination, in order to remove frost that has stuck to the surface of the windshield glass WG in cold climates, for example. In the present exemplary embodiment, a dedicated switch for defrosting is provided separately from the washer switch 36 and the wiper switch 38 in order to distinguish the defrosting instruction from the respective instructions for the wiping operation using the wiper blades 14 and the spraying of washer fluid. When the defrost switch 40 has been operated by the occupant, the operation result is input to the controller 30. When the operation result of the defrost switch 40 is input to the controller 30, the controller 30 controls so as to drive the washer pump 34 and the wiper motor 32 in order to perform the predetermined defrosting operation based on the operation result of the defrost switch 40.

The shift position sensor 42 detects a shift position of a vehicle transmission and inputs the detection result to the controller 30. When the shift position is in a parking (P) range based on the detection result of the shift position sensor 42, the controller 30 is capable of starting the above-described defrosting operation. In other words, when the shift position is in a range other than the parking (P) range, the above-described defrosting operation is prohibited from starting.

Figure 4:
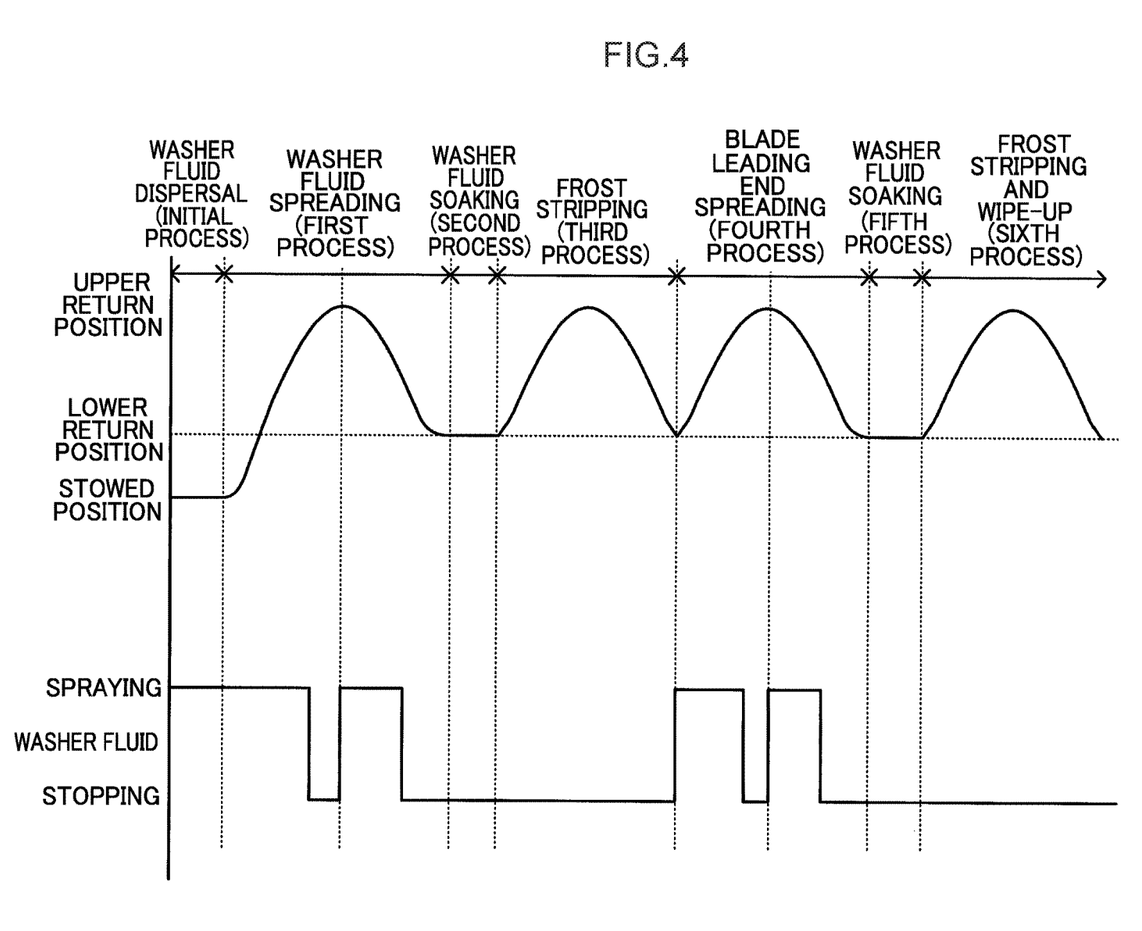
FIG. 4 is an explanatory diagram for explaining a defrosting operation by a wiper-washer control device according to the present exemplary embodiment.

Detailed explanation follows regarding the above-described defrosting operation performed by operating the defrost switch 40. FIG. 4 is a drawing for explaining the defrosting operation by the wiper-washer control device 50 according to the present exemplary embodiment.

In the present exemplary embodiment as illustrated in FIG. 4, when the defrost switch 40 is operated and the shift position is in the P range, operation of the washer pump 34 and the wiper motor 32 is controlled by the controller 30.

First, a washer fluid dispersal process is performed as an initial process (initial operation) of the defrosting operation. Specifically, the controller 30 controls the washer pump 34 so as to only spray washer fluid at the outward path swinging side of the wiper blades 14 for a specific duration, without the wiping operation using the wiper blades 14 being performed. Thus, the washer fluid pools on the wiper blades 14 and is thoroughly spread across the length direction of the wiper blades 14 without dry wiping, in a state in which the wiper blades 14 have stopped at a stopped position. Since the vehicle is stationary and the shift position is in the P range, the duration for which washer fluid is sprayed in the initial process when the defrost switch 40 has been operated is set as a longer duration than the duration when the washer switch 36 is operated and only washer fluid is sprayed out without the wiping operation using the wiper blades 14 being performed. For example, if the duration when the washer switch 36 is operated and only washer fluid is sprayed out without the wiping operation using the wiper blades 14 being performed is set from 300 ms to 500 ms, then a duration of approximately 1000 ms is applied as the specific duration.

Next, a washer fluid spreading process is performed as a first process. Specifically, the controller 30 controls the drive, speed, duration, and so on of the washer pump 34 and the wiper motor 32 such that washer fluid is sprayed and the wiping operation using the wiper blades 14 is performed. Thus, the washer fluid is spread over the frost across a wiping range of the windshield glass WG using the wiper blades 14. The wiping operation using the wiper blades 14 is performed with a first speed, which is slower than the speed of operation when the wiper switch 38 is operated and the "low speed" mode has been selected, as the wiping speed using the wiper blades 14 when this is performed. The controller 30 controls the wiper motor 32 such that the wiping operation using the wiper blades 14 at the first speed is performed once to-and-fro. When this is performed, as previously described, the controller 30 stops spraying washer fluid at the predetermined positions prior to arriving at the respective upper return position and lower return position, and the spraying is resumed after the spraying nozzles have been switched at the respective return positions, thereby preventing wasteful spraying of washer fluid. Note that a speed such as approximately half the low speed may be applied as the first speed. For example, 22 rpm may be applied as the first speed in cases in which the rotation speed of the wiper motor 32 when at low speed has been set at 42 rpm. A signal corresponding to a rotation position of an output shaft of the wiper motor 32 is input to the controller 30 from a position detector, not illustrated in the drawings, provided to the wiper motor 32, so as to determine the wiping position of the wiper blades 14.

Next, a washer fluid soaking process is performed as a second process. Specifically, the controller 30 controls the washer pump 34 and the wiper motor 32 to stop spraying washer fluid and stand-by for a specific duration while the wiping operation using the wiper blades 14 has stopped at the lower return position. Thus, the washer fluid is made to soak through the frost on the windshield glass WG. Note that the same duration as the specific duration in the washer fluid dispersal process of the initial process, for example, may be applied as the duration in which the washer fluid is made to soak through the frost.

Next, a frost stripping process is performed as a third process. Specifically, with the above-described first speed as the wiping speed of the wiper blades 14 and without washer fluid being sprayed, the controller 30 controls the wiper motor 32 such that the wiper blades 14 swing to-and-fro once at a slower speed than the "lower speed" normally employed when raindrops are wiped away. Thus, the windshield glass WG surface and the wiper blades 14 are made to slide against each other with a higher level of contact (increased friction), and the frost on the windshield glass WG is eliminated by being stripped away. Note that washer fluid may be sprayed during the frost stripping process that is the third process. The wiping operation may be performed with a second speed, which is even slower than the above-described first speed, as the wiping speed of the wiper blades 14 in the third process. In such cases, the windshield glass WG surface and the wiper blades 14 slide against each other with an even higher level of contact therebetween, thereby enabling an even greater frost stripping effect to be obtained.

Next, a blade leading end spreading process is performed as a fourth process. The fourth process is performed in consideration of cases in which an onboard camera or the like is installed at an upper portion of the windshield glass WG. Specifically, in order to spread washer fluid across the upper portion of the windshield glass WG, the controller 30 controls the washer pump 34 and the wiper motor 32 so as to perform the spraying of washer fluid and the wiping operation using the wiper blades 14. For example, the wiping operation using the wiper blades 14 is performed with a third speed (a wiping speed that is faster than the first speed), operated when the wiper switch 38 is operated and the "low speed" mode has been selected, as the wiping speed using the wiper blades 14 when this is performed. When this is performed, as previously described, the controller 30 stops spraying washer fluid at the predetermined positions directly prior to arriving at the respective upper return position and lower return position, and the spraying is resumed after the spraying nozzles have been switched at the respective return positions, thereby preventing wasteful spraying of washer fluid. Thus, in the blade leading end spreading process that is the fourth process, the wiping operation is performed at a faster wiping speed (the third speed) than in the first process, such that washer fluid is spread as far as leading ends of the wiper blades 14 by force due to inertia, and washer fluid is spread over a wider range than in the first process. In addition to spreading the washer fluid, this also enables frost that was removed in the first to the third processes to be swept away.

Next, a washer fluid soaking process that is similar to the second process is performed as a fifth process following after the fourth process. Namely, the controller 30 controls the washer pump 34 and the wiper motor 32 so as to stop spraying washer fluid and stand-by for a specific duration while the wiping operation using the wiper blades 14 has stopped at the lower return position, in order for the washer fluid to soak through the frost.

Next, a frost stripping and wipe-up process is performed as a sixth process following after the fifth process. Specifically, in order to strip the frost on leading end portions of the wiper blades 14, similarly to in the third process, the controller 30 controls the wiper motor 32 such that the wiper blades 14 swing to-and-fro once with the above-described first speed as the wiping speed of the wiper blades 14, without washer fluid being sprayed. Namely, the windshield glass WG surface and the wiper blades 14 are made to slide against each other with a higher level of contact (increased friction), and the frost on the windshield glass WG, particularly the frost on a portion corresponding to the position of the onboard camera disposed at the upper portion (a location wiped by the leading end portions of the wiper blades 14), is eliminated by being stripped away. Note that washer fluid may be sprayed in the frost stripping process that is the sixth process. Similarly to in the third process, the wiping operation may be performed with the second speed, which is even slower than the above-described first speed, as the wiping speed of the wiper blades 14 in the sixth process.

Thus, in the present exemplary embodiment, frost on the windshield glass WG surface can be easily removed by performing a defrosting operation, this being a combination of the wiping operation using the wiper blades 14 and the spraying of washer fluid, with the initial process to the sixth process described above as one cycle.

Figure 5:
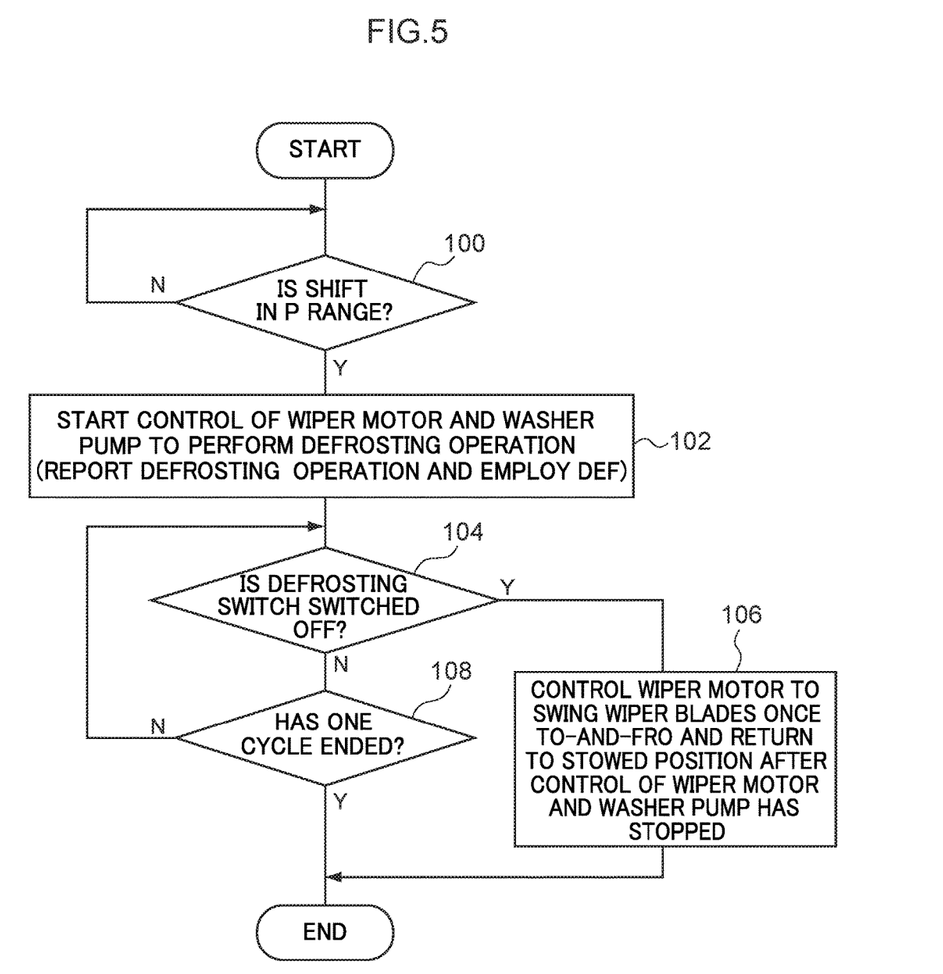
FIG. 5 is a flowchart illustrating an example of a flow of processing performed by a controller when a defrost switch has been operated to instruct defrosting, in a wiper-washer control device according to the present exemplary embodiment.

Next, explanation follows regarding a specific flow of processing performed by the wiper-washer control device 50 according to the present exemplary embodiment configured as described above. FIG. 5 is a flowchart illustrating an example of a flow of processing performed by the controller 30 when the defrost switch 40 is operated to instruct defrosting in the wiper-washer control device 50 according to the present exemplary embodiment.

First, at step 100, the controller 30 determines whether or not the shift is in the P range based on the detection result from the shift position sensor 42. In cases in which negative determination has been made, the controller 30 stands-by until affirmative determination is made, and then processing transitions to step 102. Note that instead of the determination at step 100, determination may be made as to whether or not the vehicle speed is a specific vehicle speed or below by acquiring data from a vehicle speed sensor. Alternatively, determination may be made as to whether or not the shift is in the P range and the vehicle speed is a specific low vehicle speed or below.

At step 102, the controller 30 starts to control the wiper motor 32 and the washer pump 34 so as to perform the defrosting operation, and processing transitions to step 104. Namely, the initial process, the first process, the second process, the third process, the fourth process, the fifth process, and the sixth process start in sequence. Thus, the initial process enables washer fluid to be pooled on the wiper blades 14 and dispersed across the windshield glass WG. The first process enables washer fluid to be spread over the frost in the wiping range of the windshield glass WG using the wiper blades 14. The second process enables the spread washer fluid to be made to soak through the frost. The third process enables a higher level of contact (increased friction) between the wiper blades 14 and the windshield glass WG surface, and enables the frost on the windshield glass WG to be stripped away. The fourth process enables washer fluid to also be spread toward the upper portion of the windshield glass WG by force due to inertia when spreading the washer fluid at an increased wiping speed. The fifth process enables washer fluid to be made to soak through the frost on the upper portion of the windshield glass WG. The sixth process enables the frost on the upper portion of the windshield glass WG to be stripped away and wiped-up. Thus, defrosting can be easily performed by the defrosting operation sequence. Note that when the defrosting operation is performed, an indicator may be provided to a combination meter, for example, in order to report that the defrosting operation is in process. A defroster (DEF) of an air conditioning unit may be actuated at the same time as the defrosting operation. Actuating the defroster at the same time enables the frost to be melted to assist the defrosting operation by blowing conditioned air onto the windshield glass WG.

At step 104, the controller 30 determines whether or not the defrost switch 40 is switched off. Processing transitions to step 106 in cases in which affirmative determination has been made, and processing transitions to step 108 in cases in which negative determination has been made.

At step 106, after stopping subsequent control of the defrosting operation, the controller 30 controls the wiper motor 32 to end the above processing sequence such that the wiping operation using the wiper blades 14 swings to-and-fro once and the wiper arms 12 move to the stowed position. Performing a finishing wipe to-and-fro once in this manner when the defrosting operation has ended enables a good field of vision.

At step 108, the controller 30 determines whether or not one cycle of the defrosting operation has ended. Namely, determination is made as to whether or not the initial process, the first process, the second process, the third process, the fourth process, the fifth process, and the sixth process previously described have all ended. Processing returns to step 104 and the above-described processing is repeated in cases in which negative determination has been made, and the processing sequence is ended in cases in which affirmative determination has been made.

Thus, performing the above-described defrosting operation sequence in the wiper-washer control device 50 according to the present exemplary embodiment enables the frost on the windshield glass WG to be easily eliminated without effort.

Note that one cycle of the defrosting operation of the above exemplary embodiment is not limited to that previously described. For example, a defrosting effect may be obtained with the first process, the second process, and the third process as one cycle of the defrosting operation. Alternatively, a defrosting effect may also be obtained with the initial process, the first process, the second process, and the third process as one cycle of the defrosting operation. Alternatively, a defrosting effect may also be obtained with the first process, the second process, the third process, and the fourth process as one cycle of the defrosting operation. Alternatively, a defrosting effect may also be obtained with the initial process, the first process, the second process, the third process, and the fourth process as one cycle of the defrosting operation. Alternatively, a defrosting effect may also be obtained with the first process, the second process, the third process, the fourth process, the fifth process, and the sixth process as one cycle of the defrosting operation.

Figure 6:
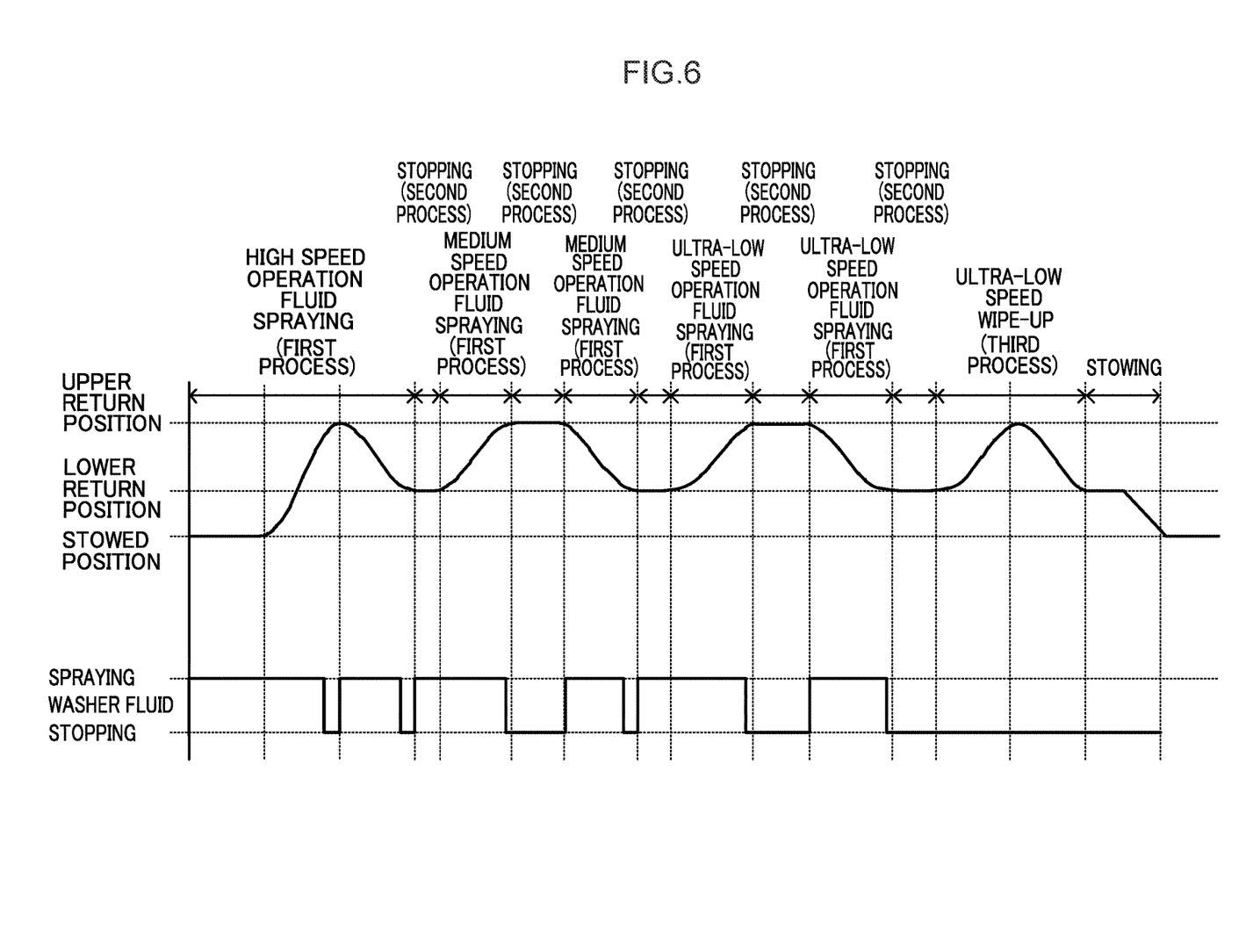
FIG. 6 a diagram for explaining a modified example of a defrosting operation by a wiper-washer control device according to the present exemplary embodiment.

The operation illustrated in FIG. 6 may also be applied as one cycle of the defrosting operation of the above exemplary embodiment. FIG. 6 is a diagram for explaining a modified example of a defrosting operation by a wiper-washer control device according to the present exemplary embodiment. Note that, as an example, one cycle of the defrosting operation in FIG. 6 is performed within one minute. In the above exemplary embodiment, a case has been explained in which there are four speeds for the wiping operation using the wiper blades 14, these being the intermittent operation, the low speed, the medium speed, and the high speed. However, explanation follows in which an ultra-low speed that is even slower than the low speed is also included in the defrosting operation in FIG. 6. Note that in FIG. 6, the spraying of washer fluid is only indicated as spraying or stopped, and the spray direction is basically the swinging direction of the wiper blades 14.

In the defrosting operation in FIG. 6, a high speed operation fluid spraying process corresponding to a first process is performed in which washer fluid is sprayed over the wiping surface for a specific duration, and the wiping operation using the wiper blades 14 is performed. Specifically, in the high speed operation fluid spraying process, only washer fluid is sprayed at the outward path swinging side of the wiper blades 14 for the specific duration without the wiping operation using the wiper blades 14 being performed. The controller 30 then controls the washer pump 34 and the wiper motor 32 such that the wiping operation to-and-fro using the wiper blades 14 is performed at the high speed while washer fluid is being sprayed. The washer fluid is first sprayed in the swinging direction of the wiper blades 14. The washer fluid is sprayed in the swinging direction of the wiper blades 14 in order to perform the wiping operation while washer fluid is being sprayed. The spraying of washer fluid is then stopped at the predetermined positions prior to arriving at the respective upper return position and lower return position, and spraying is resumed after switching the spraying nozzles at the respective return positions. This enables the washer fluid to be thoroughly spread over the length direction of the wiper blades in the state in which the wiper blades 14 have stopped in the stopped position, after which the washer fluid can be spread across the entire glass surface without dry wiping in the wiping operation that follows.

Next, a stopping process corresponding to a second process is performed in which the wiping operation using the wiper blades is stopped at a to-and-fro return position for a specific duration. Specifically, in the stopping process, the controller 30 controls the washer pump 34 and the wiper motor 32 so as to stop the wiper blades 14 at the lower return position without the wiping operation or the spraying of washer fluid being performed. This enables the sprayed washer fluid to be made to soak through to the glass surface.

Next, a medium speed operation fluid spraying process corresponding to the first process is performed in which washer fluid is sprayed over the wiping surface for a specific duration, and the wiping operation using the wiper blades 14 is performed. Specifically, in the medium speed operation fluid spraying process, the controller 30 controls the washer pump 34 and the wiper motor 32 so as to perform the wiping operation using the wiper blades 14 toward the outward path swinging side at the medium speed while washer fluid is being sprayed. The spraying of washer fluid when this is performed is toward the outward path side of the wiper blades 14, this being the swinging direction of the wiper blades 14.

Next, a stopping process corresponding to the second process is performed again in which the wiping operation using the wiper blades is stopped at a to-and-fro return position for a specific duration. Specifically, in the stopping process, the controller 30 controls the washer pump 34 and the wiper motor 32 so as to stop the wiper blades 14 at the upper return position without the wiping operation or the spraying of washer fluid being performed. The stopping duration is a longer stopping duration than the stopping duration in the stopping process at the lower return position. Thus, the sprayed washer fluid is made to soak through to the glass surface, and the sprayed washer fluid runs down along the wiper blades 14, thereby melting the frost along the wiper blades 14 and making it easier for the wiper blades 14 to abut the glass.

Next, a medium speed operation fluid spraying process corresponding to the first process is performed in which washer fluid is sprayed over the wiping surface for a specific duration, and the wiping operation using the wiper blades 14 is performed. Specifically, in the medium speed operation fluid spraying process, the controller 30 controls the washer pump 34 and the wiper motor 32 so as to perform the wiping operation using the wiper blades 14 toward the return path swinging side at the medium speed while washer fluid is being sprayed. The spraying of washer fluid when this is performed is toward the return path side of the wiper blades 14, this being the swinging direction of the wiper blades 14. Performing the stopping process at the upper return position in the manner described enables the wiper blades 14 to abut the glass, and the frost to be efficiently wiped away.

Next, a stopping process corresponding to the second process is performed again in which the wiping operation using the wiper blades is stopped at a to-and-fro return position for a specific duration. Specifically, in the stopping process, the controller 30 controls the washer pump 34 and the wiper motor 32 so as to stop the wiper blades 14 at the lower return position without the wiping operation or the spraying of washer fluid being performed. This enables the sprayed washer fluid to be made to soak through to the glass surface again.

Next, an ultra-low speed operation fluid spraying process corresponding to the first process is performed in which washer fluid is sprayed over the wiping surface for a specific duration, and the wiping operation using the wiper blades 14 is performed. Specifically, in the ultra-low speed operation fluid spraying process, the controller 30 controls the washer pump 34 and the wiper motor 32 so as to perform the wiping operation using the wiper blades 14 toward the outward path side at the ultra-low speed while washer fluid is being sprayed. The spraying of washer fluid when this is performed is toward the outward path side of the wiper blades 14, this being the swinging direction of the wiper blades 14. This enables the frost on the glass to be scraped off. In particular, in cases in which a camera or the like for imaging in front is at an upper portion of the glass, frost that has adhered in the vicinity of the camera can be scraped off, enabling an imaging field of vision of the camera to be secured.

Next, a stopping process corresponding to the second process is performed again in which the wiping operation using the wiper blades is stopped at a to-and-fro return position for a specific duration. Specifically, in the stopping process, the controller 30 controls the washer pump 34 and the wiper motor 32 so as to stop the wiper blades 14 at the upper return position without the wiping operation or the spraying of washer fluid being performed. The stopping duration is a longer stopping duration than the stopping duration in the stopping process at the lower return position.

Next, an ultra-low speed operation fluid spraying process corresponding to the first process is performed in which washer fluid is sprayed over the wiping surface for a specific duration, and the wiping operation using the wiper blades 14 is performed. Specifically, in the ultra-low speed operation fluid spraying process, the controller 30 controls the washer pump 34 and the wiper motor 32 so as to perform the wiping operation using the wiper blades 14 toward the return path side at the ultra-low speed while washer fluid is being sprayed. The spraying of washer fluid when this is performed is toward the return path side of the wiper blades 14, this being the swinging direction of the wiper blades 14. This enables the frost on the glass to be scraped off. In particular, in cases in which a camera or the like for imaging in front is at the upper portion of the glass, frost that has adhered in the vicinity of the camera can be scraped off.

Next, a stopping process corresponding to the second process is performed again in which the wiping operation using the wiper blades is stopped at a to-and-fro return position for a specific duration. Specifically, in the stopping process, the controller 30 controls the washer pump 34 and the wiper motor 32 so as to stop the wiper blades 14 at the lower return position without the wiping operation or the spraying of washer fluid being performed.

Next, an ultra-low speed wipe-up process corresponding to a third process is performed in which the spraying of washer fluid is stopped, and the wiping operation is performed. Specifically, in the ultra-low speed wipe-up process, the controller 30 controls the washer pump 34 and the wiper motor 32 so as to perform the to-and-fro wiping operation using the wiper blades 14 without the washer fluid being sprayed. This enables the entire glass surface to be wiped-up at the ultra-low speed.

The controller 30 then controls the wiper motor 32 to move the wiper blades 14 to the stowed position, and one cycle of the defrosting operation is ended.

Implementing such a defrosting operation instead of the defrosting operation of the above exemplary embodiment enables frost on the windshield glass WG to be easily eliminated without effort, similarly to in the above exemplary embodiment.

Note that in FIG. 6, an example is shown in which the stopping process corresponding to the second process is performed at both return positions, these being the upper return position and the lower return position. However, the stopping process corresponding to the second process may be performed at either the upper return position or the lower return position.

In the present exemplary embodiment, explanation has been given regarding an example in which the wiper device with nozzles for spraying washer fluid provided to the wiper arms 12 is subject to control; however, configuration is not limited thereto. For example, a wiper device with nozzles provided to the wiper blades 14 rather than to the wiper arms 12 may be subject to control. Alternatively, similar advantageous effects may be obtained by performing the above-described defrosting operation using a generic wiper device that is capable of being coupled with a washer device in which washer fluid is sprayed from a nozzle provided to the engine hood of the vehicle, for example, as the control subject.

In the present exemplary embodiment, explanation has been given regarding an example in which a wiper device is configured such that the wiper arms 12 are moved to the stowed position further toward the vehicle lower side than the lower return position. However, a wiper device configured such that the stowed position is the same position as the lower return position may be employed.

Explanation has been given above regarding an exemplary embodiment; however, the present invention is not limited to the above configuration, and obviously various modifications may be implemented within a range not departing from the spirit of the present invention.

12 wiper arm; 14 wiper blade; 18 first main nozzle; 20 second main nozzle; 30 controller; 32 wiper motor; 34 washer pump; 40 defrost switch; 50 wiper-washer control device.

What is claimed is:

1. A wiper-washer control device comprising:
   a wiper motor that causes a wiper blade to perform a wiping operation on a wiping surface;
   a washer pump that causes a washer fluid to be sprayed; and
   a control unit that, in cases in which defrosting of the wiping surface has been instructed, controls the wiper motor and the washer pump to perform a defrosting operation in which the wiping operation and spraying of washer fluid are performed in a predetermined combination,
   wherein the control unit controls the wiper motor and the washer pump such that an initial process of spraying the washer fluid for a specific duration without starting the wiping operation is performed as an initial operation prior to the defrosting operation.

2. The wiper-washer control device of claim 1, wherein:
   the control unit controls the wiper motor and the washer pump such that a first process of performing the wiping operation at a predetermined first speed, a second process of stopping both the wiping operation and the spraying of washer fluid each for a specific duration, and a third process of performing the wiping operation at the first speed or a second speed that is different from the first speed, are performed in sequence as the defrosting operation.

3. The wiper-washer control device of claim 2, wherein in the third process, the control unit is set such that the second speed is a speed of the wiping operation that is slower than the first speed.

4. The wiper-washer control device of claim 2, wherein:
   the control unit controls the wiper motor and the washer pump such that a fourth process of spraying the washer fluid on the wiping surface and performing the wiping operation at a third speed that is faster than at least one of the first speed or the second speed, is performed after the third process.

5. The wiper-washer control device of claim 4, wherein the control unit controls the wiper motor and the washer pump such that the second process and the first process are performed again in sequence after the fourth process.

6. The wiper-washer control device of claim 2, wherein: in the second process, the wiping operation of the wiper blade is stopped for a specific duration at at least one return position of two return positions in the to-and-fro wiping operation.

7. The wiper-washer control device of claim 2, wherein: in the second process, the wiping operation of the wiper blade is stopped for a specific duration at two consecutive return positions in the to-and-fro wiping operation.

8. The wiper-washer control device of claim 2, wherein: in the second process, the wiping operation of the wiper blade is stopped for a specific duration at each of two return positions in the to-and-fro wiping operation, and a stopping duration at a return position from an outward path to a return path is set as a longer stopping duration than a stopping duration at a return position from the return path to the outward path.

9. The wiper-washer control device of claim 1, wherein: the washer pump pressurizes and feeds the washer fluid to a first nozzle that sprays washer fluid toward an outward path swinging side of the wiper blade during outward path swinging of a wiper arm that swings to-and-fro between a lower return position and an upper return position of the wiper blade, and to a second nozzle that sprays washer fluid toward a return path swinging side of the wiper blade during return path swinging of the wiper arm.

10. The wiper-washer control device of claim 1, wherein a defrosting instruction section that instructs the defrosting operation is separately included.

11. A wiper-washer control device, comprising:
a wiper motor that causes a wiper blade to perform a wiping operation on a wiping surface;
a washer pump that causes a washer fluid to be sprayed; and
a control unit that, in cases in which defrosting of the wiping surface has been instructed, controls the wiper motor and the washer pump to perform a defrosting operation in which the wiping operation and spraying of washer fluid are performed in a predetermined combination,
wherein the control unit controls the wiper motor and the washer pump such that processes including a first process of spraying the washer fluid on the wiping surface for a specific duration and performing the wiping operation using the wiper blade, a second process of stopping the wiping operation using the wiper blade for a specific duration at a to-and-fro return position of the wiping operation, and a third process of stopping spraying of the washer fluid and performing the wiping operation, are performed as the defrosting operation.

12. The wiper-washer control device of claim 11, wherein: in the second process, the wiping operation of the wiper blade is stopped for a specific duration at at least one return position of two return positions in the to-and-fro wiping operation.

13. The wiper-washer control device of claim 11, wherein: in the second process, the wiping operation of the wiper blade is stopped for a specific duration at two consecutive return positions in the to-and-fro wiping operation.

14. The wiper-washer control device of claim 11, wherein: in the second process, the wiping operation of the wiper blade is stopped for a specific duration at each of two return positions in the to-and-fro wiping operation, and a stopping duration at a return position from an outward path to a return path is set as a longer stopping duration than a stopping duration at a return position from the return path to the outward path.

* * * * *

UNITED STATES PATENT AND TRADEMARK OFFICE
CERTIFICATE OF CORRECTION

PATENT NO. : 10,005,433 B2
APPLICATION NO. : 15/194584
DATED : June 26, 2018
INVENTOR(S) : Oka et al.

Page 1 of 1

It is certified that error appears in the above-identified patent and that said Letters Patent is hereby corrected as shown below:

On the Title Page

"(73) Assignee: ASMO CO., LTD., Kosai (JP)"
Should read:
"(73) Assignee: ASMO CO., LTD., Kosai (JP);
SUBARU CORPORATION, Tokyo (JP)"

Signed and Sealed this
Thirtieth Day of April, 2019

Andrei Iancu
*Director of the United States Patent and Trademark Office*